United States Patent [19]
Harmon et al.

[11] 3,734,662
[45] May 22, 1973

[54] FLAT FILM PLASTIC EXTRUSION APPARATUS

[75] Inventors: Paul E. Harmon, Fulton; Kenneth A. Mainstone, Oswega, both of N.Y. 13069

[73] Assignee: The Black Clawson Company, Hamilton, Ohio

[22] Filed: Feb. 8, 1971

[21] Appl. No.: 113,310

[52] U.S. Cl. .................425/131, 425/190, 425/376, 425/462
[51] Int. Cl. .............................B29f 3/00, B29f 3/04
[58] Field of Search.....................425/131, 132, 182, 425/186, 188, 190–192, 376

[56] References Cited

UNITED STATES PATENTS

| | | | |
|---|---|---|---|
| 2,816,741 | 12/1957 | Shuffman | 259/8 |
| 3,398,431 | 8/1968 | Corbett | 425/131 |
| 2,197,988 | 4/1940 | Tanzi | 425/190 X |
| 2,518,744 | 8/1950 | Barnhard | 156/371 |
| 3,299,474 | 1/1967 | Ashworth | 425/190 X |
| 3,559,239 | 2/1971 | Work et al | 425/131 |

Primary Examiner—J. Spencer Overholser
Assistant Examiner—Michael O. Sutton
Attorney—Marechal, Biebel, French & Bugg

[57] ABSTRACT

A die assembly for multiple layer extrusion onto a paper web substrate is movable on an overhead support beam from an on-line position over a laminating station to an off-line position transversely adjacent such station. A pair of stationary extruders feed plastic material to the die assembly through a pair of movable feed assemblies each of which includes two straight sections of conduit connected to each other by a rotary joint and connected to the extruder and to the die assembly by further rotary joints so that movement of the die assembly is enabled by a swinging and folding movement of the conduit sections. An improved die adapter is also disclosed for the simultaneous three-layer co-extrusion from the two extruders in which the film thicknesses of the outer layers are controlled with respect to the center layer.

4 Claims, 10 Drawing Figures

INVENTORS
PAUL E. HARMON &
KENNETH H. MAINSTONE

BY *Marechal, Biebel, French & Bugg*
ATTORNEYS

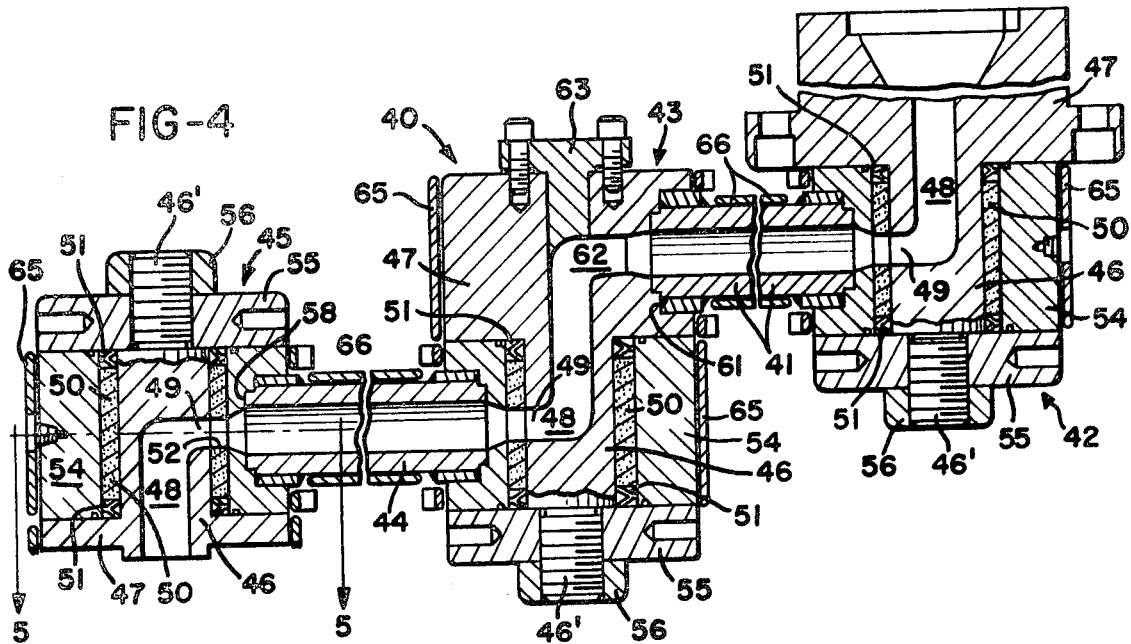
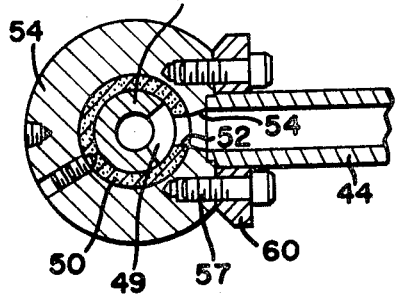
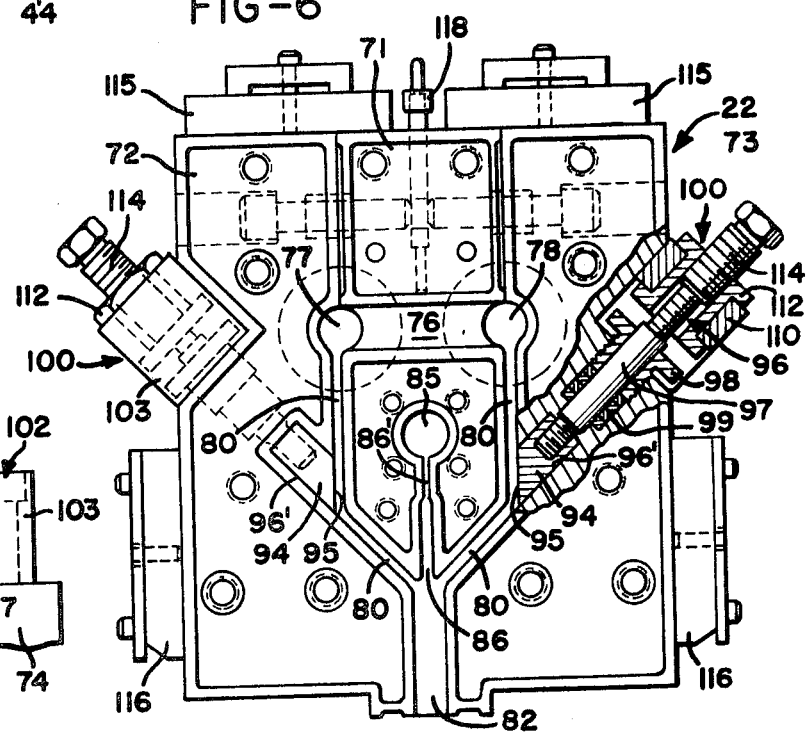
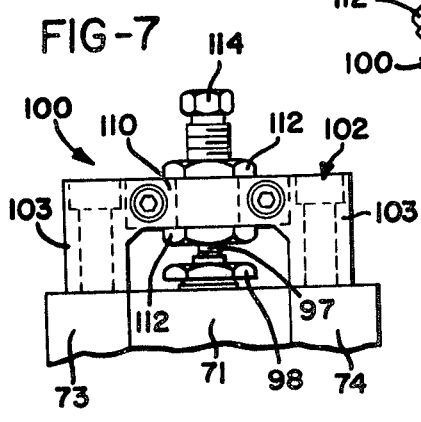

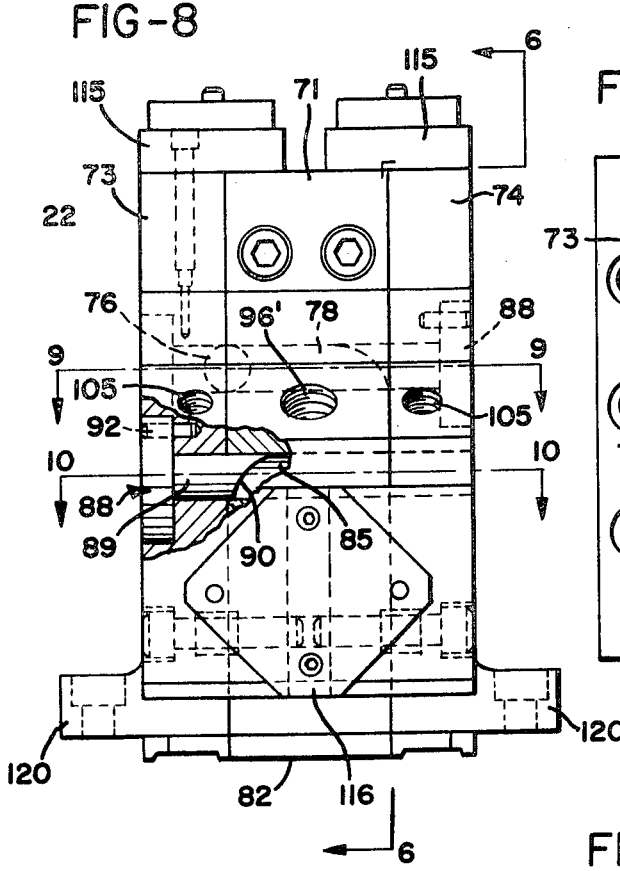
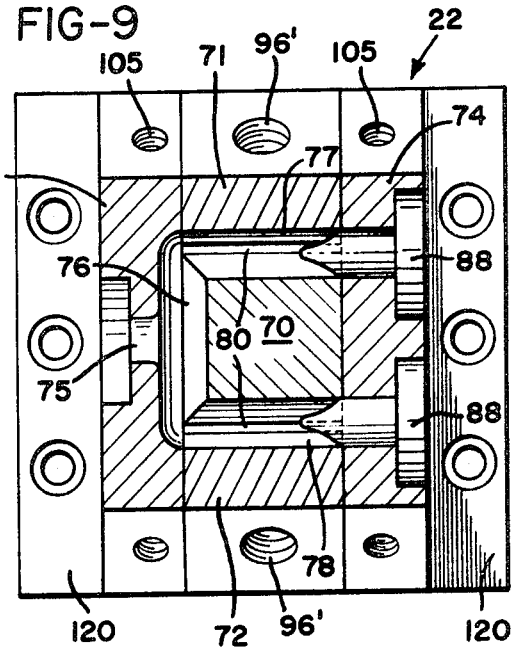
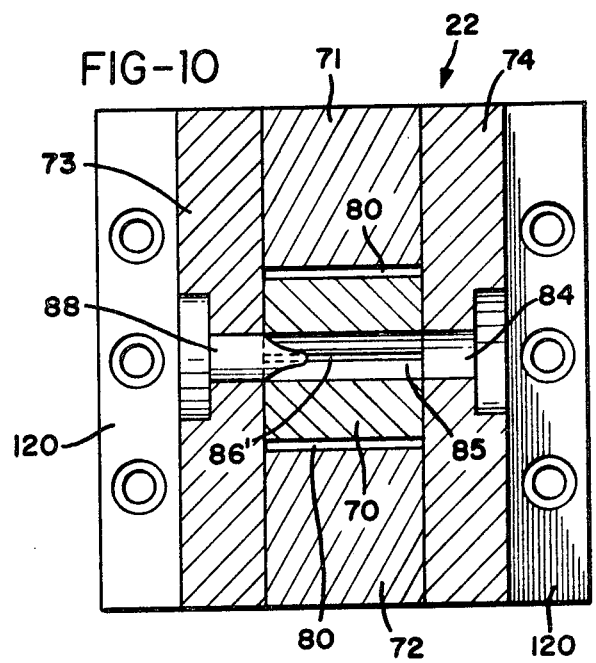

FLAT FILM PLASTIC EXTRUSION APPARATUS

BACKGROUND OF THE INVENTION

In single or multi-layer extrusion of plastic sheet material or the like, commonly one or more extruders are connected to a die positioned at a forming station. Generally such extruders are connected directly to the die or by a rigid conduit which extends over the forming station, and the extruder is supported on a movable dolly or tracks so it may be moved to an on-line position.

One problem with this arrangement is that it handicaps the efficiency of start-up operations which are performed at a location spaced from the forming station. Generally the extrusion is begun at such location and the die is adjusted, and then, while extrusion is taking place, the entire extruder-conduit-die assembly is moved and locked into operating position.

Tracks and mechanical moving means also present certain problems. The tracks must be long enough to permit the extruder to retract a substantial distance to place the die in a position for cleaning or adjustment. This unnecessarily wastes valuable plant space and correspondingly increases the cost of the installation. In addition, a period of time is required to adjust the particular die in both the longitudinal and lateral directions with respect to the forming station centerline, as well as in gauge thickness and width of extrusion and such adjusting procedure is often a hit-or-miss operation.

In multi-layer extrusion where more than one extruder is utilized, the problems referred to above are essentially multiplied. For example, where two extruders deliver different plastic materials to the die, either one extruder obstructs the path of the other or it must be located in opposed relation to it, and consequently the maneuverability and space problems are correspondingly increased.

SUMMARY OF THE INVENTION

The present invention is directed to a novel extrusion feed assembly which enables extruded material to be conveyed from one or more stationary extruders to a forming station with substantially increased efficiency and maneuverability. The feed assembly facilitates start-up and maintenance, and has substantially increased flexibility as compared with prior practice. An improved die adapter is also disclosed for the co-extrusion of two polymers from two extruders in a flat film die.

Generally, the feed assembly comprises a movable conduit assembly formed of two or more conduit sections converted by rotary joints between the extruding station and the forming station. The die and die adapter are supported on a beam for movement from a retracted off-line position adjacent the stationary extruders to an extended on-line position above the forming station. A reversible traverse motor is mounted on the support beam for moving the die between the extended and retracted positions.

The feed assembly for each extruder includes rotary connections at the extruder outlet and at the die adapter. A first conduit section is pivotally mounted to receive polymer from a rotary joint at the die while a second section is connected to a rotary joint at the die adapter. The sections are also joined together at a third rotary joint. The axes of all joints are essentially parallel and are normal to the direction of movement of the die on the support beam so the transverse movement of the die is accompanied by a simple pivotal movement of the conduit sections.

Multi-layer lamination sheets are formed by conveying the output from two or more extruders through corresponding movable or flexible conduit assemblies to an adapter mounted on the die. A three-layer sheet is formed by passing the output from one extruder through a central passage in the adapter and the output from another extruder through a second passage having branch inlet passages. A pair of inclined passages communicate with the branch passages and converge with the central passage at the outlet of the adapter where the several layers are combined for delivery to the die inlet. A pair of choker bars having beveled faces adjust the cross-sections of the branch passages and, together with the extruder output pressures, vary the relative thicknesses of the individual layers in the sheets.

BRIEF DESCRIPTION OF THE DRAWING

FIG. 4 is a fragmentary sectional view taken generally along line 4—4 of FIG. 2 and showing one of the rotary conduit assemblies;

FIG. 5 is a sectional view taken generally along the line 5—5 in FIG. 4 and showing a representative connection between a rotary connector and a tubular arm;

FIG. 6 is a side view of the adapter with one of the side plates removed looking generally along line 6—6 in FIG. 8;

FIG. 7 is a fragmentary side view of the adapter adjusting mechanism;

FIG. 8 is a partially broken away end view of the adapter;

FIG. 9 is a transverse section along line 9—9 of FIG. 8; and

FIG. 10 is a transverse section along line 10—10 of FIG. 8.

DESCRIPTION OF THE PREFERRED EMBODIMENT

Figure 1:
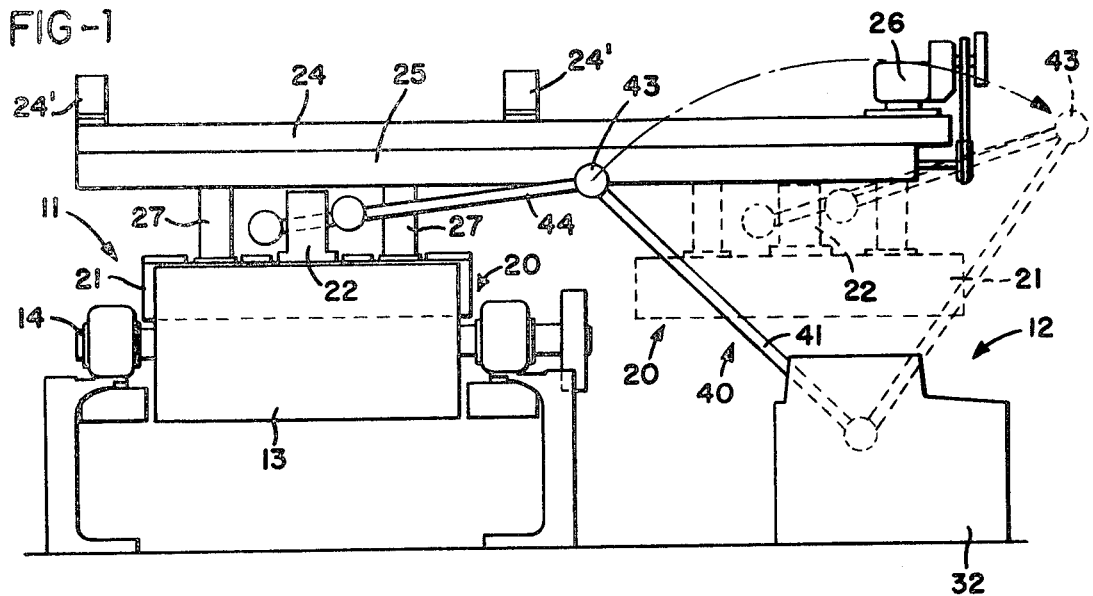
FIG. 1 is a side elevation of the extrusion feed assembly of the present invention disposed between a forming station and an extrusion station.
Figure 2:
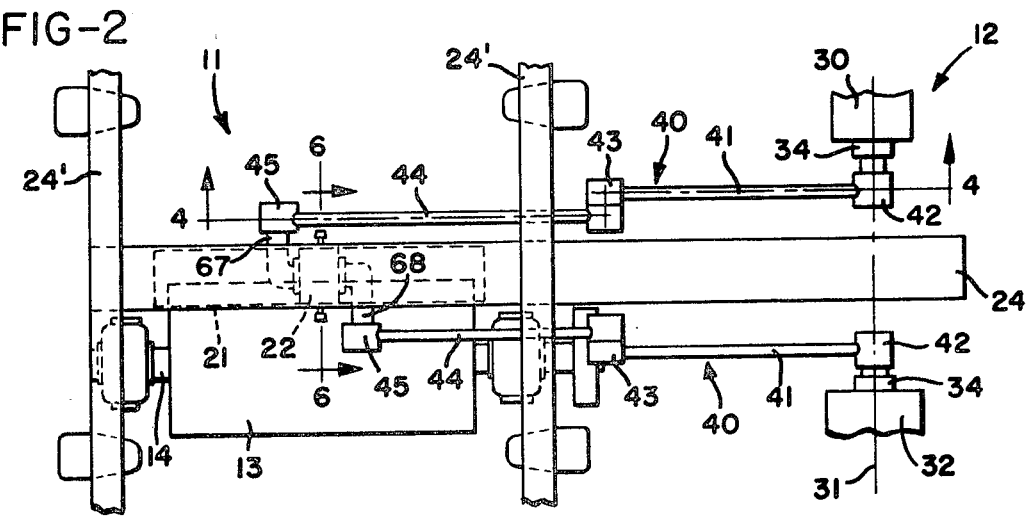
FIG. 2 is a top view of the extrusion feed assembly of FIG. 1.
Figure 3:
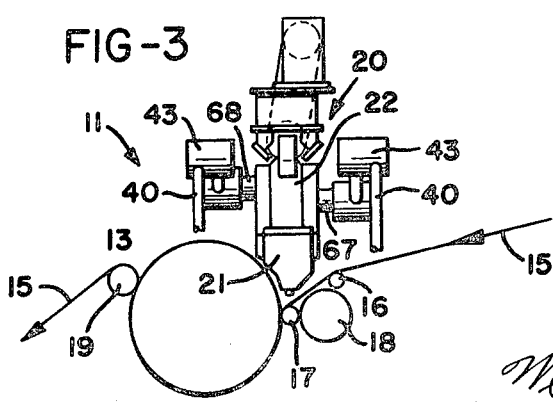
FIG. 3 is a partially broken-away end view of the extrusion feed assembly of FIG. 1.

Referring first to FIGS. 1–3, an extrusion feed assembly constructed according to the invention extends between a forming station indicated generally at 11 and a transversely spaced extruding station indicated generally at 12. The details of the forming station, as such, form no part of the present invention and is shown as comprising a laminator in which an extended sheet or film of plastic material is applied to one side of a web of paper. It is within the scope of the present invention to provide for extrusion of a single or multiple layers of plastic material without lamination. As shown in FIGS. 1 and 3, a chill roll 13 is supported on a transverse shaft 14. A web 15 of paper is delivered over a guide roll 16 to a nip formed by a small pressure roll 17 and a back up roll 18. The plastic material is applied to the web 15 at a point above the pressure nip and is carried by the web through the nip and against the chill roll 13. The combined laminated paper and plastic film web is removed from the chill roll 13 by a stripper roll 19.

The apparatus of the present invention is adapted for the application of either single or multiple film extrusion, and for the purpose of the preferred embodiment, a multiple layer co-extrusion assembly is illustrated generally at 20 and includes a flat film die 21 and a die adapter 22 mounted at the die inlet for feeding the polymer from two or more extruders to the die 21. The extrusion die 21 used with the present invention may be as shown and described in the patent of Hoffman et al. U.S. Pat. No. 3,142,090 assigned to the same assignee as this invention, with a single central inlet and an internal spreader or "coat hanger drape" passage leading from the inlet to the elongated extruding orifice. Band or induction heaters maintain the die at extruding temperature.

Means for supporting the die assembly 20 for transverse movement from an on-line position as shown in full lines in FIG. 1 to an off-line position as shown in broken lines in FIG. 1 includes a cross beam 24 comprising an overhead support track. The cross beam 24 is supported on rails 24' and slidably receives a movable support member 25. Traversing movement of the support member 25 with respect to the beam 24 is provided by a drive motor 26 through a conventional lead screw drive apparatus. The die 21 is shown as being mounted in suspended relation on the member 25 by means of a pair of vertical support beams 27. By this means, the die 21 can be moved from the off-line position to the on-line position as shown in FIG. 1.

A first stationary screw type extruder 30 is positioned along an axis line 31 along one side of the forming station 11, while a second stationary screw type extruder 32 is disposed generally along the same axis line in facing relation to the extruder 30. The extruders 30 and 32 respectively deliver molten polymer under elevated temperatures and pressure through the usual control valve and screen pack devices mounted on the ends of the extruder barrel and illustrated generally at 34. The extruders may be of the same capacity or may be of different capacities in accordance with the delivery rate and thicknesses desired for the individual laminates.

The invention further provides a novel flexible or movable conduit assembly for connecting each of the extruders 30 and 32 for feeding plastic material to the die assembly 20. To this end, separate and essentially identical conduit assemblies 40 are provided for each of the extruders.

Thus, the conduit assemblies 40 include a first conduit section 41 and has one end connected to receive plastic material through a first rotary joint 42. A second rotary joint 43 connects the first conduit section 41 to a second conduit section 44. The remote end of the second section 44 is connected to apply plastic material to the die adapter 22 through a third rotary joint 45. In installations where only a single film or thickness of plastic film material is to be extruded only one extruder and one assembly 40 would be used and the conduit section 44 and rotary joint 45 would be connected to apply molten plastic material directly to the die inlet.

The joints 42, 44 and 45 (FIG. 4) are all of similar construction and include central cylindrical body portions 46 formed with threaded ends 46' of reduced diameter and spaced flanged inner ends 47 of greater diameter. All have L-shaped passages 48 which pass through the flanged and central portions and open into outlets 49 in the outer surfaces of the central portions 46. The outlets 49 are flared in the radial direction (FIG. 5) for rotary communication with the passages in the tubular conduits.

Each joint has a tubular or sleeve-like graphite bushing 50 received over the associated central portion 46 between a pair of high temperature seals 51, and has a slot 52 aligned with the outlet 49. A tubular rotatable sleeve 54 is received around each graphite bushing 50 and is retained around the central portions 46 by a retainer nut 55 received on the threaded ends 46' of the joints, and by lock nuts 56 tightened thereagainst. The tubular sleeves 54 have a flat surface 57 cut along a chord therein, and have recesses 58 with uniformly flared openings 59 which communicate with the slots 52 in the bushings 50. The ends of the conduit sections 41 and 44 are received in the recesses 68 and attached to the sleeve 54 by a rectangular flange 60 which is welded to each end of the conduits and mates against the flat surfaces 57. Suitable bolts secure the flanges to the rotatable sleeves through appropriate holes in each side of the flange.

The intermediate joint 43 is adapted to pivot on an arc (FIG. 1) about the discharge end of the extruder and to rotate the conduit arms through the rotary sleeves 54 and accordingly includes, in addition to the aforementioned features, a recess 61 in one side of the flanged end 47 for rigidly receiving one end of the conduit 41. An S-shaped passage 62 connects the passages in each of the conduits 41 and 44 and is closed by a plug 63 with a beveled end inserted into the flanged end of the S-shaped passage 62.

To maintain the fluid state of the plastic material as it is conveyed through the conduit assemblies 40, band heaters 65 are secured around the central portions 46 of each joint 42, 43 and 44, and around the flanged end 47 of the intermediate joint 43. Circular heaters 66 are wrapped around the conduit sections 41 and 44. The interconnected and flared passages within the rotary connectors permit the fluid plastic to flow through the die as it is moved between its on-line or extended position to its off-line or retracted position. The axes of rotation of each of the joints is parallel to that of the extruder and normal to the movement of the die 21 on the overhead beam 24. This arrangement advantageously provides an overall compact assembly.

In the preferred embodiment of the invention, the extruders 30 and 32 deliver two plastic materials of differing characteristics to the die adapter 22 respectively through L-shaped connector conduits 67 and 68 which are connected at one end to the adapter inputs and which have their other ends connected respectively to one of the rotary joints 45. The adapter, itself, is designed to split the flow of polymer from one of the extruders into two streams and the flow of the other of the extruders into a single stream and to join these streams internally to form three separate and distinct layers of material. The material thus joined is applied to the inlet of the die 21.

Referring to FIGS. 6-10, the adapter 22 is shown as including a central and generally rectangular body 70. The body 70 is flanked on two of its opposite sides by a pair of essentially identical side blocks 71 and 72, and is further flanked on the remaining two opposite sides by flanged end plates 73 and 74. The end plates, together with the side blocks, define internal passageways within the adapter. The end plate 73, as shown in FIG. 9, defines a first polymer inlet 75 leading to an internal branching passageway 76. As seen, the passageway 76 is formed half in the body 70 and half in the end plate 73 for convenience of manufacture. The passageway 76 leads to a pair of parallel branches 77 and 78. These branches are, again, formed partially in the body 70 and partially in the respective side blocks 71 and 72.

The branches 77 and 78 communicate with converging slot-like passageways 80 again defined between the center body 70 and the side blocks 71 and 72, as best shown in FIG. 6. These passages converge at the bottom of the body 70 above a rectangular adapter outlet 82.

A second adapter inlet 84 is defined in the end plate 74 and leads directly into a central passageway 85 formed in the body 70. The bottom portion of the central passageway 85 opens into a constricted channel 86, again best shown in FIG. 6. The constricted upper portion 86' of the passageway 86 is designed for the purpose of regulating the rate of flow from the associated extruder into the die outlet. The bottom of passage 86 also opens centrally into the outlet 82 midway between the regions at which the converging passages 80 open into this outlet. Accordingly, flow from the extruders into the inlets 75 and 84 form a three-layer laminate at the outlet 82.

The ends of the passages 77, 78 and 85 opposite to that of the inlets are closed by identical closure plugs 88. One such plug is shown in elevation in FIG. 8. The closure plug has a cylindrical body portion 89 and an arcuately curved end 90 which defines a transitional flow control surface. The plug is keyed in predetermined alignment by a pin 92.

Means for regulating the rate of flow through the respective passages 80 includes a pair of choker bars 94 which have tapered ends 95 received and effectively forming a portion of one side wall of the channels 80. Adjustable bolt assemblies 96 have lower ends which connect with the choker bars 94 through openings 96' formed in the side plates 71 and 72. The bolts 97 are axially adjustable through a packing nut 98 and packing 99 by an adjusting mechanism 100 mounted on a U-shaped plate 102, as best shown in FIG. 7. The plate 102 has legs 103 which are bolted to the end plates 73 and 74 through openings 105, and have central connecting sections 110 which support a threaded collar 112. A threaded operator sleeve 114 has external threads in the collar 112 and internal threads received over a threaded end of the bolt 97 to effect accurate adjustment of the portion of the choker bar 94 within the associated channel 80. The choker bars 94 are operated in conjunction with the variable speed extruders to regulate the thickness of each lamination layers. The overall thickness of the layer is, of course, defined by the dimensions of the outlet 82 and this will determine the relative thickness of each layer of the resulting film.

The die adapter 22 is maintained at an elevated temperature by suitable heating means which may comprise electric resistance heaters 115 mounted on the top and 116 mounted on the sides as shown in FIG. 6. Thermocouple 118 may extend into the body 70 for the purpose of monitoring the temperature. Flanges 120 are formed on the bottoms of the end plates for attachment to the die 21.

From the drawing and above description, it is apparent that a feed assembly in accordance with the invention provides desirable features and advantages. The assembly enables extruders to be fixed at one place on the floor and the die may be retracted to a position spaced from the forming station for start-up or maintenance purposes without moving the extruders. This feature enables the extrusion operation to be started at the retracted position, where the relative thicknesses of the layers may be adjusted, and the die may thereafter be advanced to its on-line forming position, thereby facilitating start-up and substantially increasing the efficiency of the forming operation.

Since the rotary feed assemblies eliminate the need for movable extruders, which are heavy and difficult to maneuver, a larger selection of extruder sizes may be employed. In addition, the spacing of the extruders from the forming section can be altered to suit particular applications simply by varying the lengths of the tubular conduit sections, and this feature, together with the rotating connectors, eliminates the need for constructing special conduits for each operation. Inclusion of the combining adapter in the feed assembly also eliminates the need for special external valving from the extruders to the die, and simplifies multi-layer sheet extrusions by providing a means for delivering the extruded outputs to a single die inlet. The rotary conduit assembly allows at least two extruders to be used simultaneously without doubling the problems incident to movable extruders, and the extruders may be spaced from an parallel to the centerline of the forming station to conserve valuable plant space.

While the structures 30 and 32 are shown as being positioned on a common axis 31, it is obvious that the extruders may be positioned in laterally off-set relation or on separate axes, and the lengths of the arms 41 or 44 varied as necessary. Further, it is within the scope of the invention to move the extrusion assembly 20 vertically with respect to the roll 13, the vertical movement being accompanied by corresponding pivotal movement at the joints 45, 43 and 42. For example, vertical movement of either end of the extrusion die may be accomplished at the supports 27, and these supports may comprise adjusting cylinders or include screw-type adjustments. Further, the die assembly may be raised or lowered vertically, as a unit, either by a suitable adjustment at the supports 27 or by a lifting mechanism carried within the support member 25.

While the forms of apparatus herein described constitute preferred embodiments of the invention, it is to be understood that the invention is not limited to these precise forms of apparatus and that changes may be made therein without departing from the scope of the invention which is defined in the appended claims.

What is claimed is:

1. An extrusion feed assembly adapted to convey fluid plastic material from at least two stationary extruders to a die for extruding said material in a multi-layer sheet form at an extrusion station, comprising support means disposed above said extrusion station and said extruders, an adapter attached to said die, means mounting said die and adapter on said support means for movement between an advanced on-line position above said extrusion station and a retracted off-line position spaced at one side of said station, and separate rigid conduit means each including intermediate rotary means connecting each extruder to said adapter for delivering said material to said die as it is moved between said on-line and off-line positions.

2. An extrusion feed assembly as defined in claim 1 wherein each said conduit means includes first and second conduit sections, an intermediate rotary connector disposed between and joining said sections for pivotal movement, first joint means forming a rotary connection between one said extruder and said first conduit section, and second joint means forming a rotary connection between said second conduit section and said die, said rotary connections having planes of rotation normal to the direction of movement of said die support means.

3. A multiple film extruder assembly comprising an extruder station, a first screw-type extruder at one side of said station for extruding a first polymer, a second screw-type extruder positioned adjacent said station at said one side thereof for extruding a second polymer, die means having a pair of inlets and adapted to apply said polymers in a multi-layer sheet, elongated support means disposed above said station and extending transversely to a position adjacent said station at said one side thereof, means mounting said die means on said support means for movement between an on-line position above said station and an off-line position at said one station side, and separate rigid, movable conduit means connecting said extruders to said die means inlets while providing for said die movement.

4. The assembly of claim 3 in which said conduit means each have a pair of pivotally interconnected rigid conduit sections including means defining a first rotary connection between one of said sections and said die means and a second rotary connection between the other of said sections and one of said extruders.

* * * * *